United States Patent
Eto

(10) Patent No.: US 11,447,117 B2
(45) Date of Patent: Sep. 20, 2022

(54) PRESSURE SENSOR FOR A VEHICLE

(71) Applicant: Robert Bosch GmbH, Stuttgart (DE)

(72) Inventor: Masaya Eto, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 16/638,337

(22) PCT Filed: Sep. 12, 2018

(86) PCT No.: PCT/EP2018/074679
§ 371 (c)(1),
(2) Date: Feb. 11, 2020

(87) PCT Pub. No.: WO2019/068442
PCT Pub. Date: Apr. 11, 2019

(65) Prior Publication Data
US 2020/0223418 A1 Jul. 16, 2020

(30) Foreign Application Priority Data

Oct. 5, 2017 (DE) ...................... 10 2017 217 647.4

(51) Int. Cl.
*B60T 17/22* (2006.01)
*G01L 13/00* (2006.01)
(Continued)

(52) U.S. Cl.
CPC ............ *B60T 17/221* (2013.01); *G01L 13/00* (2013.01); *G01L 19/06* (2013.01); *G01L 19/14* (2013.01); *B60T 2270/88* (2013.01)

(58) Field of Classification Search
CPC ....... B60T 17/221; G01L 13/00; G01L 19/06; G01L 19/14
(Continued)

(56) References Cited

U.S. PATENT DOCUMENTS 11,099,094 B2 * 8/2021 Martin .................... G01L 19/06
2001/0029786 A1 * 10/2001 Takakuwa ........... G01L 19/0636
73/706

(Continued)

FOREIGN PATENT DOCUMENTS

CN 102596668 A 7/2012
JP 2009-68350 A 4/2009
(Continued)

OTHER PUBLICATIONS

International Search Report corresponding to PCT Application No. PCT/EP2018/074679, dated Jan. 22, 2019 (German and English language document) (5 pages).

*Primary Examiner* — Nathaniel T Woodward
(74) *Attorney, Agent, or Firm* — Maginot, Moore & Beck LLP

(57) ABSTRACT

A pressure sensor for a vehicle includes a housing, in which at least one sensor unit is arranged. The at least one sensor unit determines a pressure difference between a pressure at a measurement connection point and atmospheric pressure. The at least one sensor unit senses the atmospheric pressure at at least two reference pressure bores. The disclosure further relates to a braking system for a vehicle, having at least one such pressure sensor. A sensor dewatering means comprises a connection channel, which connects the at least two reference pressure bores to each other.

9 Claims, 3 Drawing Sheets

(51) Int. Cl.
*G01L 19/06* (2006.01)
*G01L 19/14* (2006.01)

(58) Field of Classification Search
USPC .......................................... 188/152
See application file for complete search history.

(56) References Cited

U.S. PATENT DOCUMENTS

2012/0144923 A1    6/2012  Yahata
2016/0178474 A1*   6/2016  Spanevello ......... G01L 19/0015
                                                      73/39

FOREIGN PATENT DOCUMENTS

JP     2012-065940 A    4/2012
JP      2015-11004 A    1/2015
WO     2017/098797 A1   6/2017

* cited by examiner

PRESSURE SENSOR FOR A VEHICLE

This application is a 35 U.S.C. § 371 National Stage Application of PCT/EP2018/074679, filed on Sep. 12, 2018, which claims the benefit of priority to Serial No. DE 10 2017 217 647.4, filed on Oct. 5, 2017 in Germany, the disclosures of which are incorporated herein by reference in their entirety.

The disclosure is based on a pressure sensor for a vehicle and a braking system for a vehicle having at least one such pressure sensor.

BACKGROUND

Known from the prior art are pressure sensors for vehicles, having a housing in which there is arranged at least one sensor unit that determines a pressure difference between a pressure prevailing at a measurement connection and atmospheric pressure. The at least one sensor unit senses the atmospheric pressure at at least two reference pressure holes. Such pressure sensors may be used, for example, in a brake booster of a vehicle, in order to determine a pressure difference between a brake pressure prevailing in the brake booster and atmospheric pressure. Such a pressure sensor is exposed to rainwater during driving. A housing of the pressure sensor is designed in such a manner that the pressure sensor can pick up the correct atmospheric pressure despite rainwater penetration. For this reason, the pressure sensor usually comprises at least two reference pressure holes that are subjected to atmospheric pressure, such that the pressure difference between the brake pressure prevailing in the brake booster and atmospheric pressure can be measured directly, at two points, by the pressure sensor. In this case, the two reference pressure holes are arranged in such a manner that a first reference pressure hole is geodetically higher than a second reference pressure hole. Owing to the force of gravity, the water flows out of the higher, first reference pressure hole to the lower, second reference pressure hole, and onward out of the housing. However, it may happen that, because of the surface tension, penetrated water can become trapped both in the second reference pressure hole, which is located lower down, and the first reference pressure hole, which is located higher up, so that the atmospheric pressure cannot be correctly sensed in any of the reference pressure holes.

SUMMARY

The pressure sensor for a vehicle having the features described herein has the advantage that the penetrated water can be removed from at least one of the at least two reference pressure holes, such that the pressure sensor can correctly sense the atmospheric pressure.

Embodiments of the present disclosure provide a pressure sensor for a vehicle, having a housing in which there is arranged at least one sensor unit that determines a pressure difference between a pressure prevailing at a measurement connection and atmospheric pressure. The at least one sensor unit senses the atmospheric pressure at at least two reference pressure holes. In this case, a sensor drainage means comprises a connecting channel that connects the at least two reference pressure holes to each other.

Additionally proposed is a braking system for a vehicle, comprising at least one brake booster, at least one brake circuit and at least one such pressure sensor.

Advantageous improvements of the pressure sensor, and of the braking system for a vehicle, are rendered possible by the measures and developments specified herein.

It is particularly advantageous that, in the installed state, a first reference pressure hole in the housing can be arranged geodetically higher than a second reference pressure hole. In addition, the connecting channel, on the basis of the surface tension, can suck penetrated water out of the higher, first reference pressure hole and conduct it to the lower, second reference pressure hole. Owing to gravity, the water flows from the higher, first reference pressure hole to the lower, second reference pressure hole, and onward out of the housing. In addition, the connecting channel can suck the water from the higher, first reference pressure hole and conduct it to the lower, second reference pressure hole. As a result, the water level in the higher, first reference pressure hole and in the higher region of the connecting channel sinks, such that, advantageously, there is no more water at least in the higher, first reference pressure hole, and the pressure sensor can sense the atmospheric pressure, as reference pressure, via the first reference pressure hole.

In an advantageous design of the pressure sensor, the housing may comprise a receiving space in which the sensor unit may be arranged. In addition, a cover may be connected to the housing and cover the receiving space, the connecting channel and the at least two reference pressure holes. The cover may, for example, prevent water or moisture from entering the receiving space of the sensor unit during driving. Since the reference pressure holes are subjected to atmospheric pressure, the cover cannot prevent water or moisture from entering the housing region where the reference pressure holes are located.

In a further advantageous design of the pressure sensor, the housing may be realized as a plastic injection-molded part. This advantageously allows cost-effective mass production of the housing.

In an advantageous design of the braking system, a first pressure sensor may determine a first pressure difference, between a brake pressure prevailing in the brake booster and atmospheric pressure. Additionally or alternatively, a second pressure sensor may determine a second pressure difference, between a brake pressure prevailing in the at least one brake circuit and atmospheric pressure.

An exemplary embodiment of the disclosure is represented in the drawing, and explained in greater detail in the description that follows. In the drawing, components, or elements, that perform the same or similar functions are denoted by the same reference numerals.

DETAILED DESCRIPTION

Figure 1:
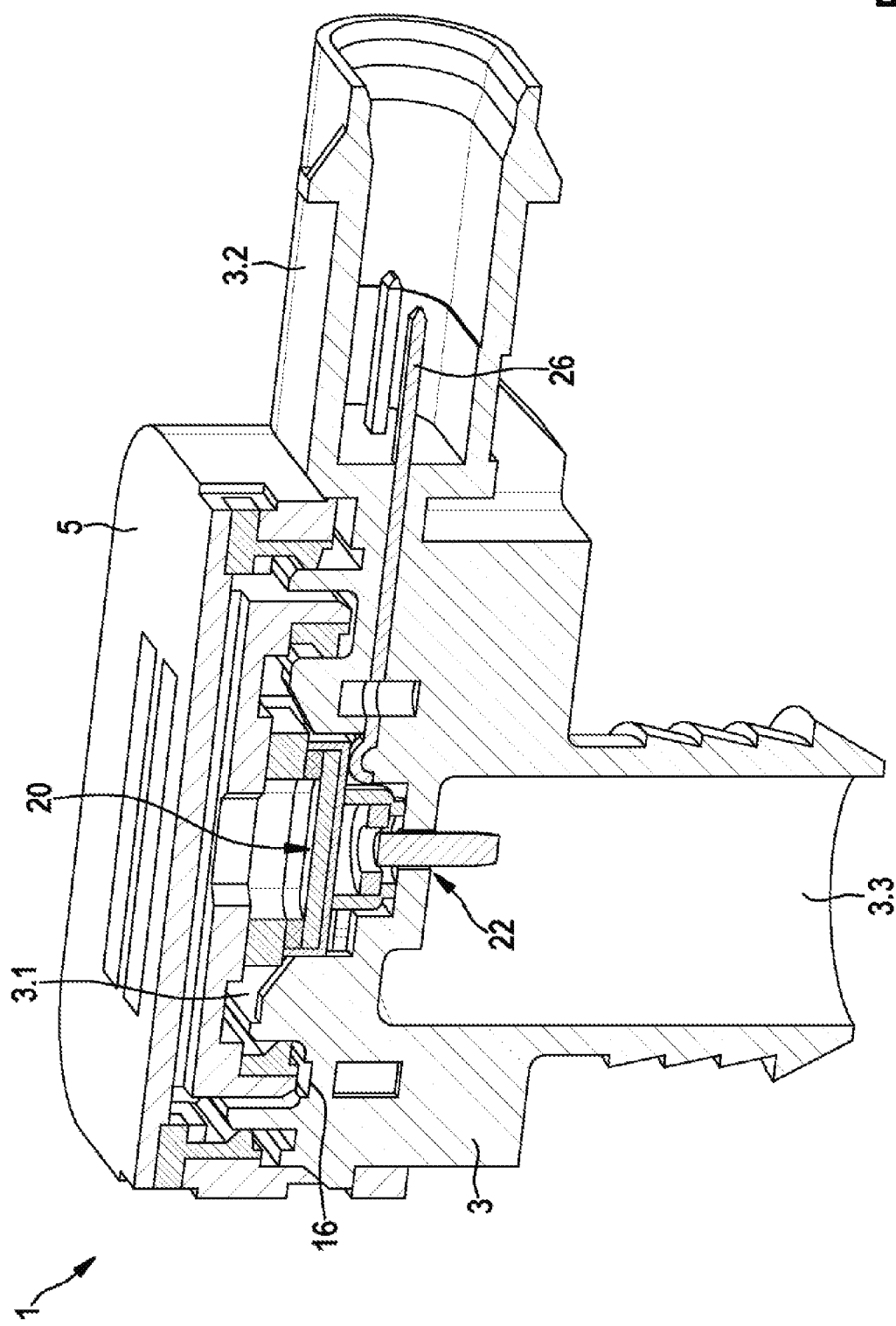
FIG. 1 shows a schematic perspective sectional representation of an exemplary embodiment of a pressure sensor according to the disclosure for a vehicle.

As can be seen from FIGS. 1 to 5, the represented exemplary embodiment of a pressure sensor 1 according to the disclosure for a vehicle comprises a housing 3, in which there is arranged at least one sensor unit 20 that determines a pressure difference between a pressure prevailing at a measurement connection 3.3 and atmospheric pressure. The at least one sensor unit 20 senses the atmospheric pressure at at least two reference pressure holes 12, 14. In this case, a sensor drainage means 10 comprises a connecting channel 16, which connects the at least two reference pressure holes 12, 14 to each other.

Figure 2:
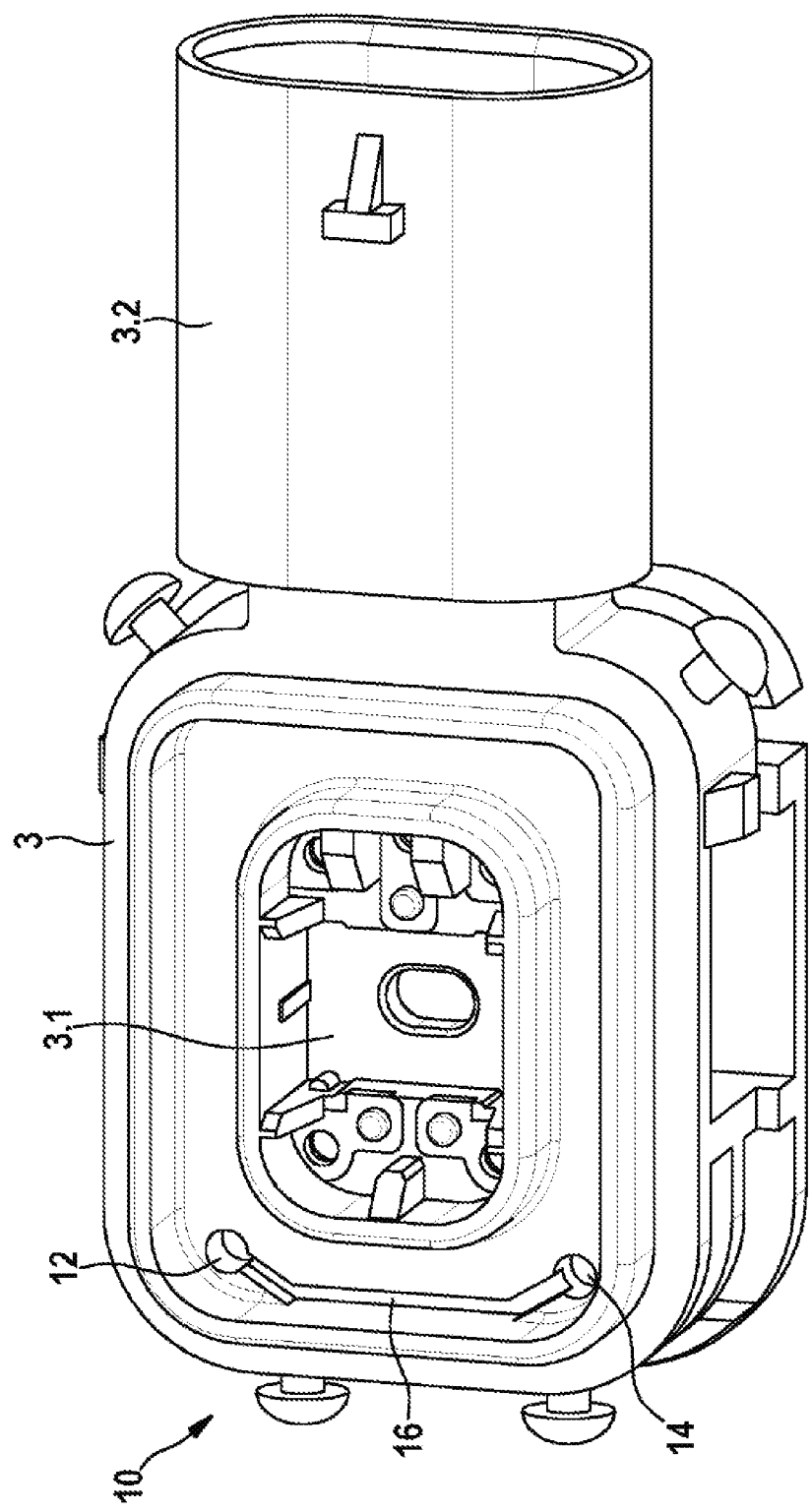
FIG. 2 shows a schematic perspective representation of a housing for the pressure sensor from FIG. 1, from above.

As can additionally be seen from FIG. 2, in the represented exemplary embodiment the pressure sensor 1 comprises two reference pressure holes 12, 14. In this case, when installed, a first reference pressure hole 12 in the housing 3 is arranged geodetically higher than a second reference pressure hole 14.

As can additionally be seen from FIGS. 1 and 2, in the represented exemplary embodiment the housing 3 comprises a receiving space 3.1 in which the sensor unit 20 is arranged. The receiving space 3.1 is sealed, by means of a seal 22, toward the measurement connection 3.3. Furthermore, a cover 5 is connected to the housing 3, and covers the receiving space 3.1, the connecting channel 16 and the at least two reference pressure holes 12, 14. In the represented exemplary embodiment, the housing 3 and the cover 5 are each realized as plastic injection-molded parts, in which lines are inserted as inserts. In the represented exemplary embodiment, the sensor unit 20 prepares the sensed measurement values, and determines and outputs the desired pressure difference or the desired sensor data via an interface. For the output of the sensor data, the housing 3 comprises a contact receiver 3.2, as a mechanical interface, into which a corresponding plug-in connector can be inserted, and contact elements 26, which are connected to the sensor unit 20 and via which electrical connections can be made to corresponding mating contact elements in the plug-in connector. In the exemplary embodiment shown, the contact receiver 3.2 is formed onto the housing 3.

Figure 5:
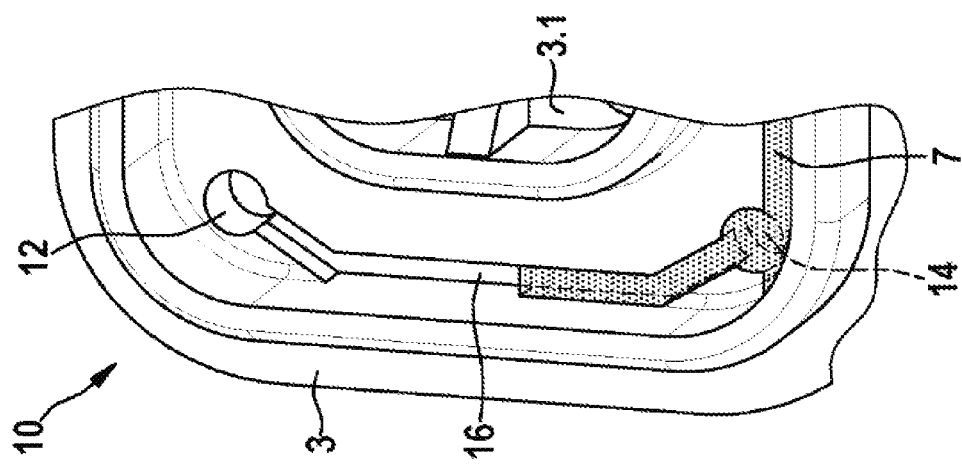
FIG. 3 to 5 show a detail of the housing from FIG. 2 during various phases of a spray-water test.
Figure 4:
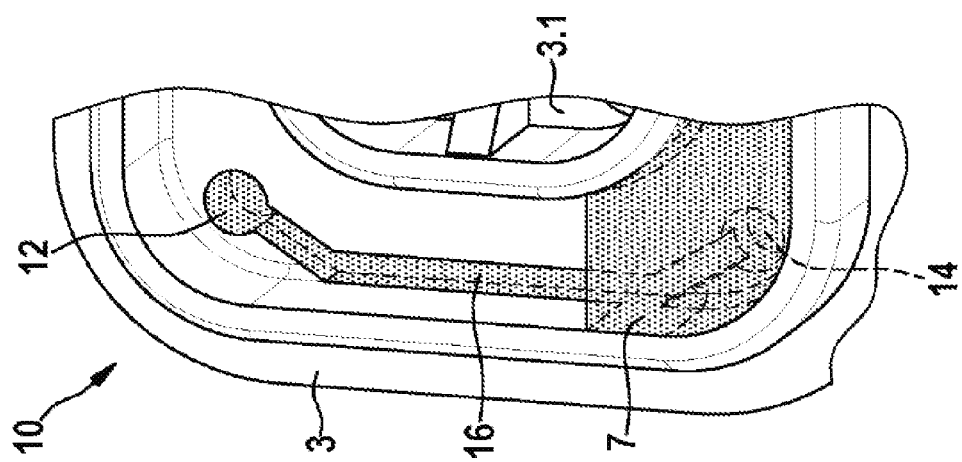

The procedure of a spray-water test for the pressure sensor 1 is described below with reference to FIG. 3 to 5.

Figure 3:
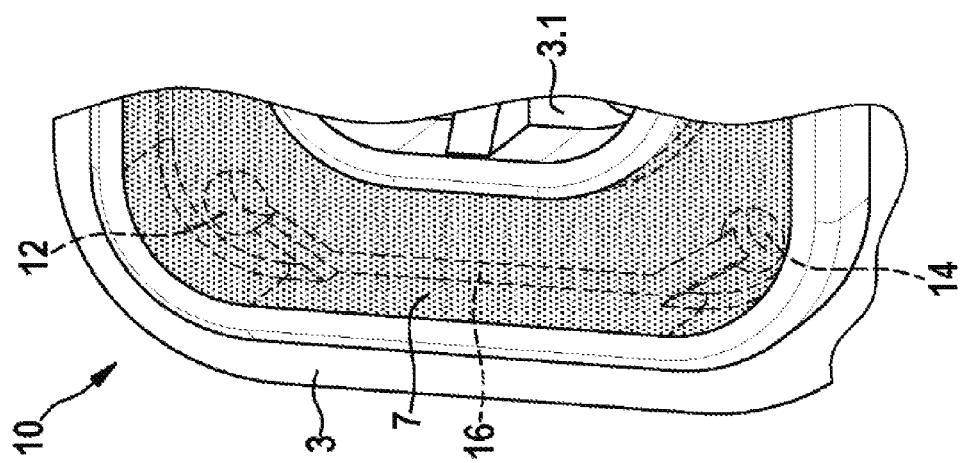

As can be further seen from FIG. 3, in the splash-water test the housing 3 of pressure sensor 1 is filled with water 7, at least in the section of the reference pressure holes 12,14. The housing 3 is then turned into its installation position, shown in FIGS. 4 and 5, such that the first reference pressure hole 12 is arranged higher than the second reference pressure hole 14. As can be further seen in FIG. 4, owing to gravity, the water 7 flows off from the higher, first reference pressure hole 12 to the lower, second reference pressure hole 14, and onward out of the housing 3. As can be further seen from FIG. 5, the connecting channel 16, on the basis of the surface tension, additionally sucks the penetrated water 7 out of the higher, first reference pressure hole 12 and conducts it to the lower, second reference pressure hole 14. This causes the water level in the higher, first reference pressure hole 12 and in the higher region of the connecting channel 16 to sink, such that there is no more water 7 at least in the higher, first reference pressure hole 12, and the sensor unit 20 of the pressure sensor 3 can sense the atmospheric pressure, as reference pressure, via the first reference pressure hole 12.

Embodiments of the pressure sensor 1 according to the disclosure may preferably be used in braking systems for vehicles that comprise at least one brake booster and at least one brake circuit. Thus, for example, a first pressure sensor 1 may determine a first pressure difference, between a brake pressure prevailing in the brake booster and atmospheric pressure. A second pressure sensor 1 may determine, for example, a second pressure difference, between a brake pressure prevailing in the at least one brake circuit and atmospheric pressure.

Embodiments of the present disclosure provide a pressure sensor for a vehicle in which, in the installed state, the penetrated water is advantageously removed at least from one of the reference pressure holes, such that the pressure sensor can correctly sense the atmospheric pressure.

The invention claimed is:

1. A pressure sensor for a vehicle, comprising:
   a housing;
   at least one sensor unit arranged in the housing and configured to determine a pressure difference between a pressure prevailing at a measurement connection and atmospheric pressure;
   at least two reference pressure holes, the at least one sensor unit sensing the atmospheric pressure at the at least two reference pressure holes; and
   a sensor drainage arrangement a connecting channel that connects the at least two reference pressure holes to each other.

2. The pressure sensor as claimed in claim 1, wherein, in the installed state, a first reference pressure hole of the at least two reference pressure holes in the housing is arranged geodetically higher than a second reference pressure hole of the at least two reference pressure holes.

3. The pressure sensor as claimed in claim 2, wherein the connecting channel, via surface tension, sucks penetrated water out of the higher, first reference pressure hole and conducts it the penetrated water to the lower, second reference pressure hole.

4. The pressure sensor as claimed in claim 1, wherein the housing comprises a receiving space in which the sensor unit is arranged.

5. The pressure sensor as claimed in claim 4, further comprising a cover is connected to the housing so as to cover the receiving space, the connecting channel and the at least two reference pressure holes.

6. The pressure sensor as claimed in claim 1, wherein the housing is configured as a plastic injection-molded part.

7. A braking system for a vehicle, comprising:
   at least one brake booster;
   at least one brake circuit; and
   at least one pressure sensor comprising:
      a housing;
      at least one sensor unit arranged in the housing and configured to determine a pressure difference between a pressure prevailing at a measurement connection and atmospheric pressure;
      at least two reference pressure holes, the at least one sensor unit sensing the atmospheric pressure at the at least two reference pressure holes; and
      a sensor drainage arrangement having a connecting channel that connects the at least two reference pressure holes to each other.

8. The braking system as claimed in claim 7, wherein a first pressure sensor of the at least one pressure sensor is configured to determine a first pressure difference between a brake pressure prevailing in the brake booster and atmospheric pressure.

9. The braking system as claimed in claim 8, wherein a second pressure sensor of the at least one pressure sensor is configured to determine a second pressure difference between a brake pressure prevailing in the brake circuit and atmospheric pressure.

* * * * *

UNITED STATES PATENT AND TRADEMARK OFFICE
CERTIFICATE OF CORRECTION

PATENT NO. : 11,447,117 B2
APPLICATION NO. : 16/638337
DATED : September 20, 2022
INVENTOR(S) : Eto It is certified that error appears in the above-identified patent and that said Letters Patent is hereby corrected as shown below:

In the Claims

In Claim 1, at Column 4, Line 18: "drainage arrangement a connecting channel" should read --drainage arrangement having a connecting channel--.

In Claim 3, at Column 4, Line 29: "conducts it the penetrated water" should read --conducts the penetrated water--.

In Claim 5, at Column 4, Line 36: "a cover is connected" should read --a cover connected--.

Signed and Sealed this
Twenty-eighth Day of March, 2023

Katherine Kelly Vidal
*Director of the United States Patent and Trademark Office*